United States Patent
Faucheux et al.

(10) Patent No.: US 10,763,522 B2
(45) Date of Patent: Sep. 1, 2020

(54) DEVICE INTENDED TO GENERATE ELECTRICITY FROM A PLANAR FUEL CELL COOLED BY AIR FLOW

(71) Applicant: Commissariat A L'Energie Atomique et aux Energies Alternatives, Paris (FR)

(72) Inventors: Vincent Faucheux, Lans en Vercors (FR); David Alincant, La Verpilliere (FR); Philippe Capron, Virieu sur Bourbre (FR); Anis Daami, Bembla (TN)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 734 days.

(21) Appl. No.: 15/608,355

(22) Filed: May 30, 2017

(65) Prior Publication Data

US 2017/0346106 A1    Nov. 30, 2017

(30) Foreign Application Priority Data

May 30, 2016   (FR) ..................... 16 00876

(51) Int. Cl.
*H01M 8/04* (2016.01)
*H01M 8/0267* (2016.01)
(Continued)

(52) U.S. Cl.
CPC ......... *H01M 8/0267* (2013.01); *H01M 8/006* (2013.01); *H01M 8/0258* (2013.01);
(Continued)

(58) Field of Classification Search
CPC combination set(s) only.
See application file for complete search history.

(56) References Cited

U.S. PATENT DOCUMENTS

| | | |
|---|---|---|
| 2004/0197620 A1 | 10/2004 | Arthur |
| 2009/0117445 A1 | 5/2009 | Sekino |

(Continued)

FOREIGN PATENT DOCUMENTS

| | | |
|---|---|---|
| GB | 2 442 252 A | 4/2008 |
| GB | 2503240 A | 12/2013 |
| WO | WO 2012/117035 A1 | 9/2012 |

OTHER PUBLICATIONS

French Preliminary Search Report dated Jan. 11, 2017 in French Application 16 00876 filed on May 30, 2016 (with English Translation of Categories of Cited Documents and Written Opinion).

*Primary Examiner* — Jacob B Marks
(74) *Attorney, Agent, or Firm* — Oblon, McClelland, Maier & Neustadt, L.L.P.

(57) ABSTRACT

A device intended to generate electricity includes a planar fuel cell having: cells each provided with an anode and a cathode associated with a membrane, and a first face and a second face opposite to the first face, the first face being arranged on the side with the anodes of the fuel cell and the second face being arranged on the side with the cathodes of the fuel cell. Furthermore, this device includes a system configured to generate a first air flow intended to cooperate thermally with the first face, and configured to generate a second air flow intended to cooperate with the second face to ensure the supply of oxidizer to the cathodes of the fuel cell.

18 Claims, 3 Drawing Sheets

Figure 1:
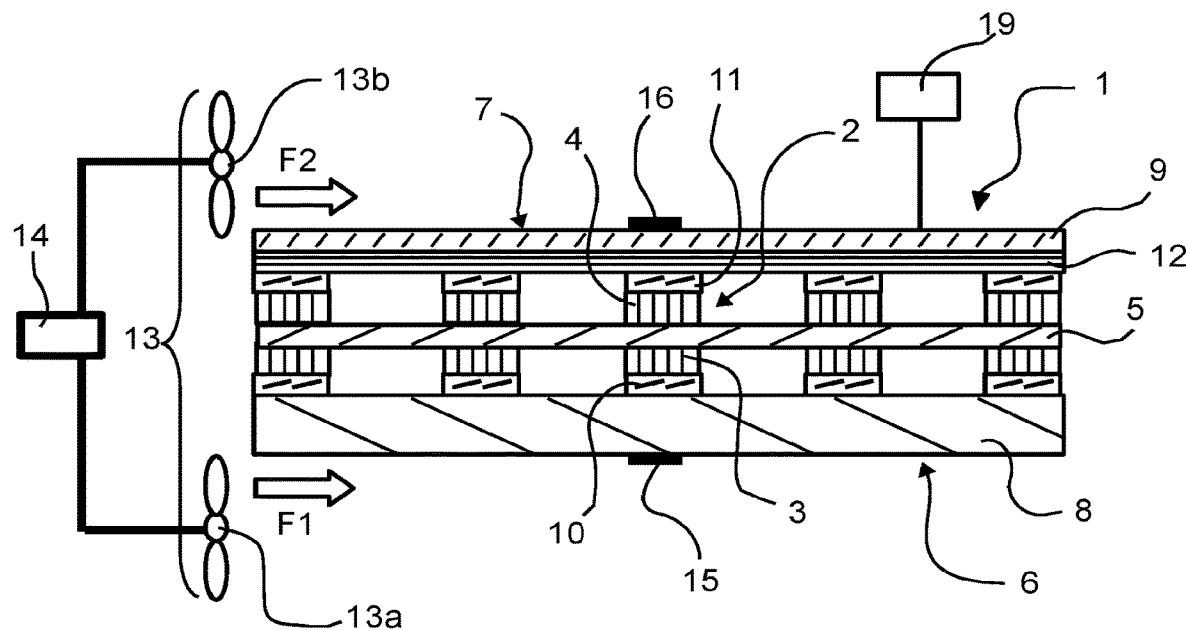

(51) Int. Cl.
 H01M 8/04701 (2016.01)
 H01M 8/2418 (2016.01)
 H01M 8/249 (2016.01)
 H01M 8/0432 (2016.01)
 H01M 8/04492 (2016.01)
 H01M 8/04014 (2016.01)
 H01M 8/04828 (2016.01)
 H01M 8/04082 (2016.01)
 H01M 8/00 (2016.01)
 H01M 8/04089 (2016.01)
 H01M 8/0258 (2016.01)
 H01M 8/0438 (2016.01)
 H01M 8/04746 (2016.01)
 H01M 8/04302 (2016.01)
 H01M 8/1018 (2016.01)
 H01M 8/04303 (2016.01)
 H01M 8/04537 (2016.01)

(52) U.S. Cl.
 CPC ....... *H01M 8/045* (2013.01); *H01M 8/04014* (2013.01); *H01M 8/0485* (2013.01); *H01M 8/04089* (2013.01); *H01M 8/04201* (2013.01); *H01M 8/04358* (2013.01); *H01M 8/04365* (2013.01); *H01M 8/04417* (2013.01); *H01M 8/04529* (2013.01); *H01M 8/04723* (2013.01); *H01M 8/04731* (2013.01); *H01M 8/04768* (2013.01); *H01M 8/04828* (2013.01); *H01M 8/249* (2013.01); *H01M 8/2418* (2016.02); H01M 8/0432 (2013.01); *H01M 8/0438* (2013.01); *H01M 8/04302* (2016.02); *H01M 8/04303* (2016.02); *H01M 8/04492* (2013.01); *H01M 8/04649* (2013.01); *H01M 2008/1095* (2013.01)

(56) References Cited

U.S. PATENT DOCUMENTS

2014/0057138 A1 2/2014 Brett et al.
2014/0154604 A1 6/2014 Brett et al.
2016/0268612 A1* 9/2016 Ushiyama ......... H01M 8/04701

* cited by examiner

DEVICE INTENDED TO GENERATE ELECTRICITY FROM A PLANAR FUEL CELL COOLED BY AIR FLOW

FIELD OF THE INVENTION

The invention concerns the field of electricity generation from a fuel cell.

PRIOR ART

In the field of electricity generation, it is known to employ fuel cells. Generally, a fuel cell during its operation generates water and heat, in addition to electricity. Under given environmental conditions of use (temperatures, humidities, pressures), it is possible to keep the performance of the fuel cell stable over time, and this in a passive manner.

However, in actual operation, the fuel cell is liable to be used in a broad range of temperatures, humidities and pressures. In this case, the fuel cell is generally associated with a system allowing the heat produced by the fuel cell to evacuate, to maintain constant hydration of a membrane, and to supply oxygen from the air to the cathode of the fuel cell.

It is in this context that the document US2004/0197620 proposes using the same fan having the air flow generated by it divided into two parts, on the one hand for cooling the fuel cell and on the other hand for supplying oxygen to the cathodes of the fuel cell. The solution of this document is addressed solely to fuel cells known in the field as a "stack". Fuel cells in the form of a stack are not adapted for low-power needs.

Documents GB2442252 and GB2503240 propose using a recirculation of air to have fuel cells of "stack" type operate in a broad range of temperatures. These solutions present the same problems in regard to low power, and so there is a need to propose a device which is better adapted to low power.

Patent application WO2012/117035 describes a fuel cell using a membrane combined with electrodes connected in series, making possible the stack of fuel cells. However, the cooling of the fuel cells may be difficult to accomplish. Thus, there is a need to propose a device enabling an adapted control, in other words enabling an adjustment, of the temperature of a fuel cell of the device.

Patent application US2009/0117445 describes a planar fuel cell. There is a need to improve such a planar fuel cell, notably by proposing a solution allowing its temperature to be controlled, or adjusted, in satisfactory manner.

Moreover, there is a need to find an alternative solution to the existing solutions.

PURPOSE OF THE INVENTION

The purpose of the invention is to address, at least in a part, the needs listed above.

One approaches this purpose thanks to a device intended to generate electricity comprising a planar fuel cell comprising: cells each provided with an anode and a cathode associated with a membrane, and a first face and a second face opposite to said first face, said first face being arranged on the side with the anodes of said fuel cell and said second face being arranged on the side with the cathodes of said fuel cell. This device also comprises a system configured to generate a first air flow intended to cooperate thermally with the first face, and configured to generate a second air flow intended to cooperate with the second face to ensure the supply of oxidizer to the cathodes of said fuel cell.

Preferably said membrane is common to all the cells of said fuel cell.

According to one embodiment, the first face of said fuel cell may be bounded off at least in part by an outer wall of a fuel distribution chamber, and the second face of said fuel cell may be bounded off at least in part by a perforated plate, notably metallic.

The device may comprise a control module configured to act on the system in order to control the first and second air flow in independent manner.

Furthermore, the control module may be configured to receive at its input at least one of the following parameters in order to determine at least one control setpoint for the system: a temperature value of the fuel cell, a humidity value of the fuel cell, a physical parameter of electrical resistance measured at the level of the fuel cell, a temperature value of the environment in which the device is placed, a humidity value of the environment in which the device is placed, a value of the load demanded from the fuel cell, an atmospheric pressure value of the environment in which the device is placed, an indicator of a duration of storage of the device, an indicator of the output of the fuel cell, an indicator of the heat flow exchanged with the outside.

According to one particular embodiment, said fuel cell forms a first fuel cell and the device comprises an additional planar fuel cell forming a second fuel cell comprising cells each provided with an anode and a cathode associated with a membrane of the second fuel cell, preferably said membrane being common to all the cells of said second fuel cell. This second fuel cell also comprises a first face and a second face opposite to said first face, said first face being arranged on the side with the anodes of said second fuel cell and said second face being arranged on the side with the cathodes of said second fuel cell. Furthermore, the first and second fuel cells are arranged such that the first face of the first fuel cell is facing the first face of the second fuel cell so as to bound off at least partly a channel for circulation of the first air flow between the first and second fuel cells, or such that the second face of the second fuel cell is facing the second face of the first fuel cell so as to bound off at least partly a channel for circulation of the second air flow between the first and second fuel cells.

In particular, the system may comprise a first ventilation element able to generate the first air flow and a second ventilation element able to generate the second air flow.

According to one embodiment, the device may comprise a temperature sensor arranged so as to measure a temperature value of the fuel cell, the control module being configured to take into account at least one temperature value measured by the temperature sensor to influence the characteristics of the first air flow when controlling said system.

According to another embodiment, which may be combined with the one in which the device comprises the temperature sensor, the device may comprise a humidity sensor arranged so as to measure a humidity value of the fuel cell, said control module being configured to take into account at least one humidity value measured by the humidity sensor to influence the characteristics of the second air flow when controlling said system.

According to one embodiment, the device may comprise an element configured to adapt the output of the fuel cell, said element receiving at its input a value representative of the temperature of the core of the fuel cell in order to produce an output setpoint to be applied to the fuel cell.

The invention also relates to a flying object comprising at least one device as described and in which the system configured to generate the first air flow and the second air flow is such that at least one of the first and second air flows is generated during the flight of said flying object.

The invention also relates to a method of utilization of a device as described, said method comprising an operating step comprising a step of generating the first air flow by the system such that said first air flow generated cooperates with the first face of the fuel cell and a step of generating the second air flow by the system such that said second air flow generated cooperates with the second face of the fuel cell.

Preferably, the operating step may comprise: a step of determining at least one temperature value of the fuel cell, a step of determining at least one humidity value of the fuel cell, a step of adjustment of the first air flow generated during the step of generating the first air flow taking into account said at least one temperature value determined, a step of adjustment of the second air flow taking into account said at least one humidity value determined.

The method may comprise a step of start-up of the fuel cell such that said fuel cell initially has a degraded output less than a nominal output of the fuel cell, said start-up step involving a step of increasing the output of the fuel cell up to the nominal output, notably in a progressive or stepwise manner. Notably, the flow rate of the first air flow increases during the step of increasing the output.

The method may also comprise a step of start-up of the fuel cell in which the system is controlled by taking into account at least one of the following parameters determined at the level of a start-up phase of the fuel cell: a temperature value of the environment in which the device is used, a humidity value of the environment in which the device is used, an indicator of a duration of a storage period of the device.

The method may also comprise a step of shut-down of the fuel cell during which the second air flow is generated to dry out the core of the fuel cell.

The method may also comprise a step of modulation of the output of the fuel cell dependent on a representative value determined for the temperature of the core of the fuel cell.

SUMMARY DESCRIPTION OF THE FIGURES

Figure 2:
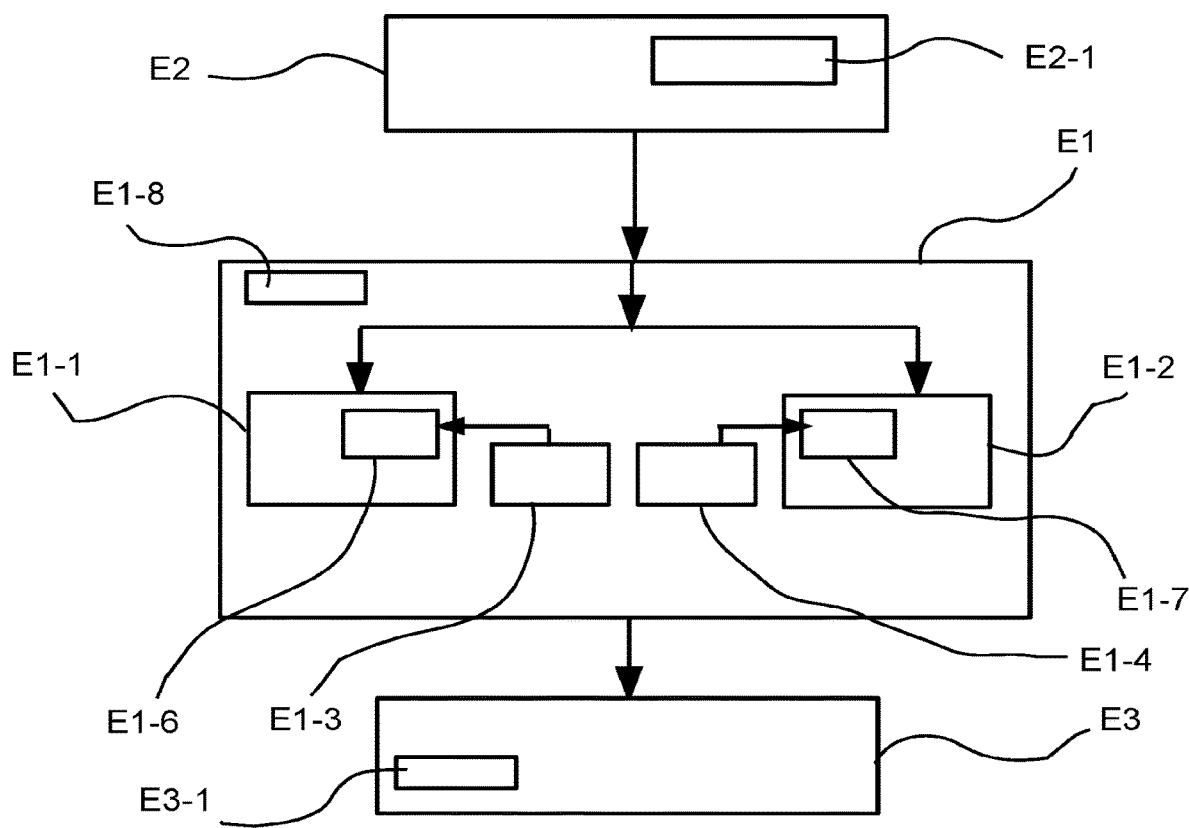
Figure 3:
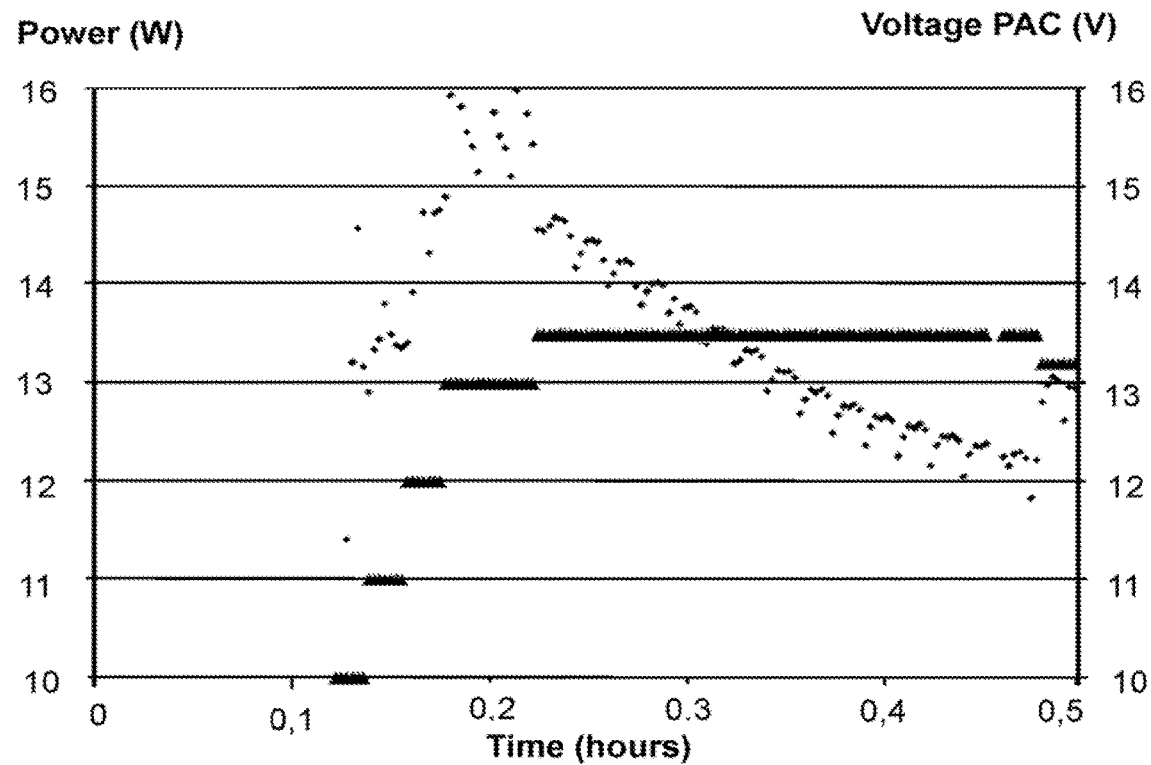
Figure 4:
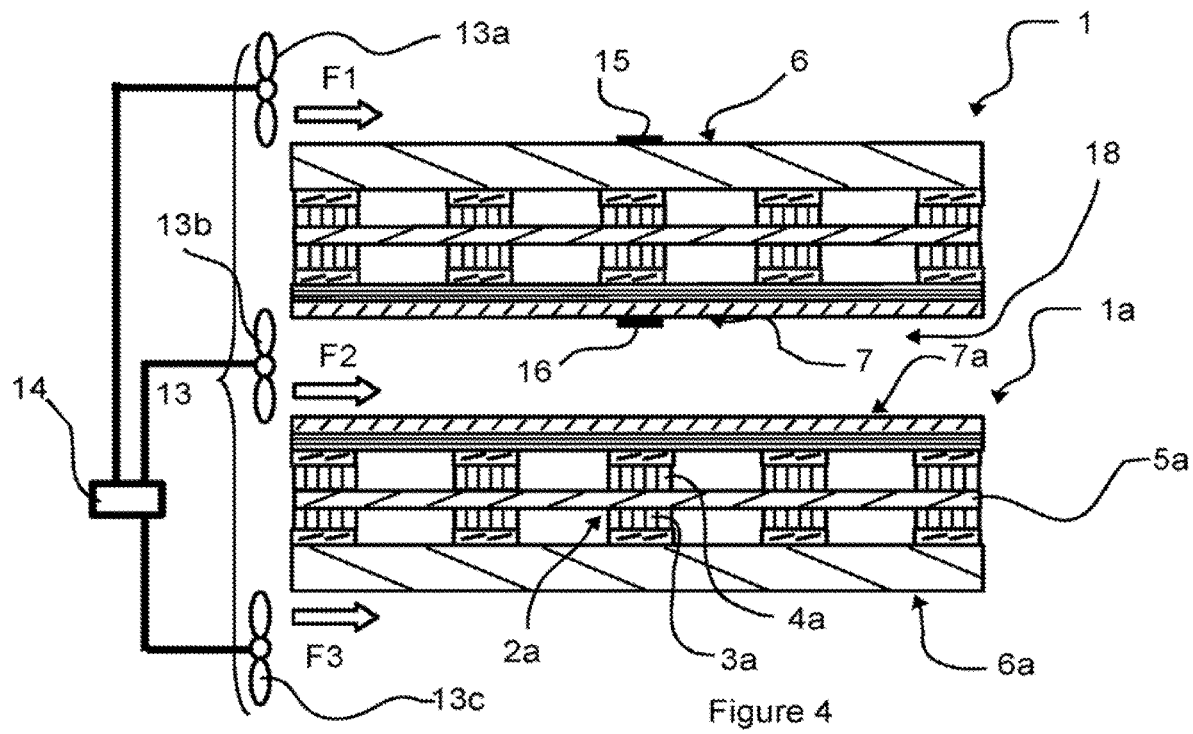
Figure 5:
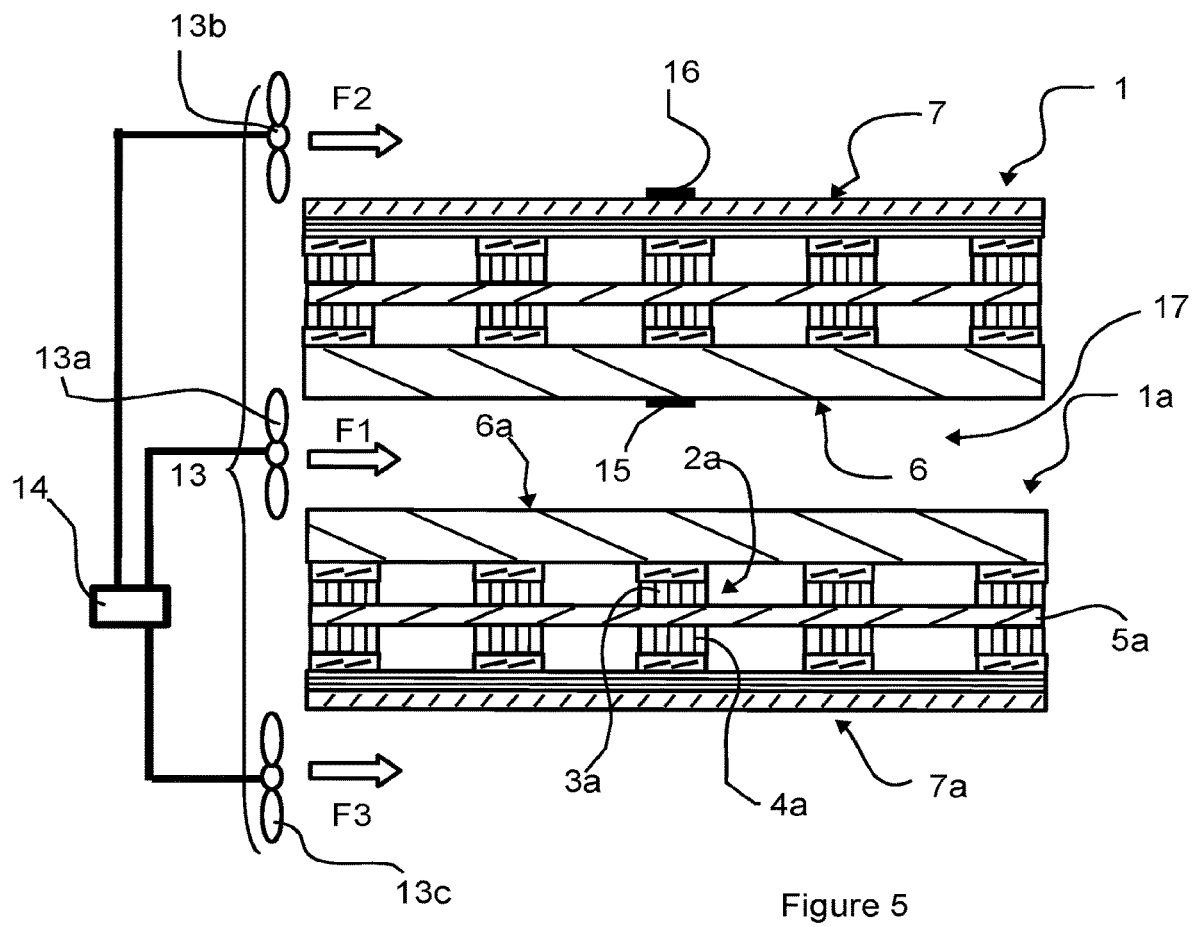
Figure 6:
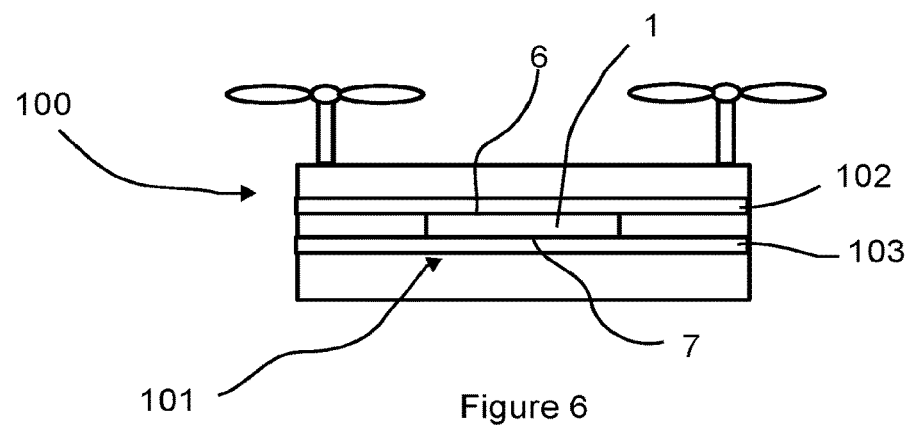

The invention will be better understood upon perusal of the following description, provided solely as a nonlimiting example and making reference to the drawings, in which:

FIG. 1 schematically illustrates a fuel cell device according to one embodiment of the invention, FIG. 2 illustrates steps of carrying out a method of utilization of the device, FIG. 3 illustrates in the same graph the variation in the power in watts provided by a fuel cell as a function of time and the variation in voltage in volts on the terminals of the fuel cell (denoted by PAC in FIG. 3) as a function of time, FIG. 4 illustrates an embodiment in which the device comprises two fuel cells placed on top of each other, FIG. 5 illustrates a variant of FIG. 4, FIG. 6 illustrates a flying object outfitted with the device of FIG. 1.

In these figures, the same references are used to designate the same elements.

Moreover, the elements represented in the figures are not true to scale.

DESCRIPTION OF PARTICULAR EMBODIMENTS

The device and the method described below differ from the prior art in that they propose notably the utilization of a movement of air at the level of two opposite faces of a fuel cell. By controlling these movements of air in independent manner, it is possible to have a better control of the temperature of the fuel cell in order to optimize its operation in a broad range of outside conditions. The outside conditions may correspond to variable temperatures, pressures or humidities.

The present invention is most particularly interested in planar fuel cells. A planar fuel cell in fact corresponds to the formation of several cells in the same plane disposed side by side, as opposed to stacks where the cells of a fuel cell are stacked. The planar design is most particularly adapted to form portable and transportable energy sources of low power. Typically, in the present description by low power is meant a power less than 100 W. Furthermore, the planar technology also makes it possible to do without bipolar plates for separation and distribution of oxidant and fuel flow.

Furthermore, the present invention concerns the field of fuel cells whose oxidant flow (i.e. oxidizer) is air. By air is meant in the present description a gaseous mixture which is found in the earth's atmosphere. In this case, the cathodes may be directly exposed to the free air and at atmospheric pressure. In common speech, the air which one finds in the earth's atmosphere contains oxygen which can then serve as oxidizer for the fuel cell.

FIG. 1 schematically illustrates a device intended to generate electricity comprising a planar fuel cell 1 comprising cells 2 each provided with an anode 3 and a cathode 4 associated with a membrane 5. Preferably, said membrane 5 is common to all the cells 2 of said fuel cell. The membrane 5 is generally an ionic, notably a protonic, conducting membrane, such as one of type NAFION®. The membrane is also known in the art under the name electrolyte. In FIG. 1, the fuel cell 1 comprises five cells 2 as an illustration. The fuel cell 1 can generate electricity when oxidizer (here, air) is brought to its cathodes and when a fuel (for example $H_2$, i.e. dihydrogen) is brought to its anodes. This fuel cell 1 comprises a first face 6 and a second face 7 opposite to said first face 6, said first face 6 being arranged on the side with the anodes 3 of said fuel cell 1 and said second face 7 being arranged on the side with the cathodes 4 of said fuel cell 1. By "the side with the anodes 3" is meant that the first face 6 is closer to the anodes 3 than to the cathodes 4, notably the first face 6 is included in a plane parallel to the plane including the anodes 3 of the cells of the fuel cell 1. By "the side with the cathodes 4" is meant that the second face 7 is closer to the cathodes 4 than to the anodes 3, notably the second face 7 is included in a plane parallel to the plane including the cathodes 4. Generally, in such a fuel cell 1 the cells are joined together in series.

In particular, the first face 6 of said fuel cell is bounded off at least in part (or in its entirety) by an outer wall of a fuel distribution chamber 8 configured to distribute fuel, notably gaseous, to the anodes for the operation of the fuel cell, and the second face 7 of said fuel cell 1 is bounded off at least in part (or in its entirety) by a perforated plate 9. This plate 9 may be made of metal (plastic or paper) so as to promote heat exchanges. The perforations of the plate 9 are intended to let through air in the direction of the cathodes so that this air serves as oxidizer for the fuel cell. The fuel distribution chamber 8 may be formed in usual manner, for example, by a plate having fuel distribution channels (not represented), and the fuel may be $H_2$.

In nonlimiting manner, the fuel cell 1 may comprise the stack of the following elements: the fuel distribution chamber 8, first current collectors 10 notably made of gold formed at the level of each anode 3 and interposed between the anodes 3 and the distribution chamber 8, the anodes 3 comprising for example carbon and platinum and each in contact with an associated first current collector 10, the membrane 5 which is common to all the cells 2 and in contact with the anodes 3, the cathodes 4 comprising for example carbon and platinum and in contact with the membrane 5, second current collectors 11 each associated with a cathode 4, a gas diffusion layer 12 in contact with the current collectors 11 and enabling the diffusion of air in the direction of the cathodes 4 (this gas diffusion layer may be a sheet of cellulose or even a PTFE (polytetrafluorethylene) membrane), and finally the perforated plate 9 which may be made of copper or aluminium. The perforated plate 9 and the gas diffusion layer 12 may be formed as the same layer, notably electrically insulating. Other examples of fuel cells with other materials could be used by the skilled person as need be. Preferably, the fuel cell shown has a height comprised between 0.5 mm and 5 mm and more particularly of the order of 2 mm, and lateral dimensions (notably bounding off the surfaces of the first and second faces) comprised between 5 cm and 100 cm and more particularly of the order of 12 cm. The assembly formed by the anodes 3, the membrane 5, the cathodes 4, and possibly the first and second current collectors 10, 11 is more commonly called the core of the fuel cell, core of the cell, or cell core in the art. Typically, for a load applied to the fuel cell, the cell core has an optimal temperature to meet the needs of that load. The load corresponds to a consumer element, such as an engine, connected to the fuel cell, which supplies it electrically.

In the present description, when a dimension is given in association with the words "of the order of", one will understand precisely the dimension given or the dimension given plus or minus 10%.

The device further comprises a system 13 configured to generate a first air flow F1 intended to cooperate thermally with the first face 6, notably to cool said fuel cell 1, said system 13 being also configured to generate a second air flow F2 intended to cooperate with the second face 7 to ensure the supply of oxidizer to the cathodes 4 of said fuel cell 1. The first and second air flows may be generated by aspiration or blowing. It is also possible to say that the first air flow ventilates the fuel cell notably at the level of the first face 6, and the second air flow ventilates the fuel cell notably at the level of the second face 7. By "first air flow F1 intended to cooperate with the first face 6 to cool said fuel cell 1" is meant that when the first air flow F1 is generated, notably by forced convection, it flows in a way that interacts thermally with the first face 6, in other words, the first air flow F1 comes into contact with the first face 6, and notably it is able to carry away calories from the first face 6, resulting in a cooling of the fuel cell 1. Thus, the system 13 may be configured so as to allow the first air flow F1 to come into contact with the first face 6 when it is generated. By "second air flow F2 intended to cooperate with the second face 7 to ensure the supply of oxidizer to the cathodes 4 of said fuel cell 1" is meant that when the second air flow F2 is generated, notably by forced convection, it flows in a way that brings air, notably the oxygen of air, at the level of the second face 7 which is then in fluidic communication with the cathodes, in other words the second air flow F2 comes into contact with the second face 7. Thus, the system 13 may be such as to orient the first and second air flows F1, F2 so that they reach respectively the first face 6 and the second face 7, this orientation possibly be implemented by the use of adapted channels or conduits. By "cooperate thermally with said first face" is meant that the first air flow F1 can enable the cooling of the first face 6 and thus of the fuel cell, or more generally participate in the thermal regulation of the fuel cell 1. When the first face 6 is bounded off at least in part by an outer wall of the combustion chamber 8 and when the second face 7 is bounded off at least in part by the perforated plate 9, it will be understood that the first and second air flows F1, F2 are brought as close as possible to the core of the fuel cell 1. As a result, if one desires to regulate the temperature of the fuel cell 1, the heat exchanges will occur in efficient manner, thus limiting the electric power consumed by the system 13.

It will then be understood that the invention also relates to a method of utilization of the device described. As illustrated by FIG. 2, the method comprises an operating step E1 comprising a step E1-1 of generating the first air flow F1 by the system 13 such that said first air flow generated cooperates with the first face 6 of the fuel cell 1 and a step E1-2 of generating the second air flow F2 by the system 13 such that said second air flow F2 generated cooperates with the second face 7 of the fuel cell. During this operating step E1, the fuel cell can generate electricity. One thus understand that the method may comprise steps of routing of the first and second air flows F1, F2 generated respectively at the level of the first face 6 and the second face 7 of the fuel cell, notably by utilizing adapted channels or conduits.

The system 13 may be such as to allow the generation of the first and second air flows F1, F2 in independent manner, that is, the first and second air flow F1, F2 do not have the same characteristics, such as flow rate: it is thus possible to distinguish a first function—implemented by the second air flow F2—of providing oxidizer and maintaining the hydration of the membrane 5, which can also implicitly take part in the regulation of the temperature of the fuel cell, and a second function—implemented by the first air flow—of solely regulating the temperature of the fuel cell, notably for its cooling. This distinction enables an operation of the fuel cell over broader ranges of temperatures, humidities and pressures while still allowing a nominal operation. The objective of the double ventilation described (first air flow and second air flow) is to maintain a stable temperature of the core of the fuel cell to ensure a satisfactory level of performance of the fuel cell, notably regardless of the ambient temperature or the humidity of the environment in which the device is used. Thus, the device may comprise a control module 14 configured to act on the system 13 in order to control/adjust the first and second air flows F1, F2 in independent manner.

In this regard, there is a need to know how to control the system 13 in order to obtain adequate first and second air flows F1, F2. For this, the control module 14 may be configured to receive at its input at least one of the following parameters in order to determine at least one control setpoint for the system 13: a temperature value of the fuel cell, a humidity value of the fuel cell, a physical parameter of electrical resistance measured at the level of the fuel cell, a temperature value of the environment in which the device is placed, a humidity value of the environment in which the device is placed, a value of the load demanded from the fuel cell 1, an atmospheric pressure value of the environment in which the device is placed, an indicator of a duration of storage of the device, an indicator of the output of the fuel cell 1, an indicator of the heat flow exchanged with the outside (we are speaking here of the heat exchange between the fuel cell and the outside). One control setpoint might be, for example, to increase or decrease the flow rate of the first air flow and/or of the second air flow. The environment in which the device is placed correspond to the outside environment of the device. The physical parameter of electrical resistance measured at the level of the fuel cell may be a measurement of resistance of the fuel cell or a cell of the fuel cell, it may be an internal resistance, a polarization resistance or a total resistance which may for example allow an inferring of the temperature of the core of the cell or the humidity of the membrane of the fuel cell without having to use the temperature or humidity sensors. One will thus understand that the control module 14 can use some or all of these parameters to evaluate the current or future state of the fuel cell 1 in order to modify the first air flow F1 and/or the second air flow F2 in order to optimize the functioning of the fuel cell 1. By optimizing the functioning of the fuel cell is meant, for example, making sure that the core of the cell remains near an optimal temperature and that the concentration of oxygen brought at the level of the cathodes is sufficient. In the context of the method, it will be understood that the latter may involve a step of determining all or some of these parameters and a step of utilization of the latter to control the system 13, for example by adjusting the flow rate of the first air flow F1 and/or the flow rate of the second air flow F2. In the rest of the description, examples of utilization of the parameters shall be given. These examples are not limiting and could be adapted by the skilled person according to their needs. In particular, the purpose of the control module 14 is to ensure the maintaining of the core of the cell at its nominal operating temperature, and preferably while allowing sufficient oxygen to be brought in from the air and enabling a maintaining of the hydration of the membrane at a value allowing a good operating efficiency of the fuel cell.

The temperature value of the fuel cell may be measured at the level of the latter, notably so as to be representative of or dependent on the temperature of the core of the fuel cell 1. The humidity value of the fuel cell may be measured at the level of the fuel cell 1, notably so as to be representative of the hydration of the membrane 5. In the example using the temperature value of the fuel cell and/or the humidity value of the fuel cell, the device may comprise (FIG. 1) a temperature sensor 15 arranged so as to measure the temperature value of the fuel cell 1, the control module 14 being then configured to take into account at least one temperature value measured by the temperature sensor 15 in order to influence the characteristics of the first air flow F1 by controlling said system 13, for example, by ensuring the holding of the temperature of the fuel cell, notably its core, in a predetermined range of temperatures. The temperature sensor 15 may be fixed at the level of the first face 6, for example, on the outer wall of the distribution chamber 8, or alternatively the temperature sensor may also be fixed at the level of the second face 7. The second air flow F2 may be set at a setpoint enabling sufficient air to be brought at the level of the cathodes 4 for the operation of the fuel cell. The fuel cell 1 generates water, so it is subject to a risk of "wetting" of the cathodes; to prevent this, the second air flow F2 also participates in the evaporation of water when it circulates at the level of the second face 7. In this regard, the device may also comprise a humidity sensor 16 (FIG. 1) arranged so as to measure the humidity value of the fuel cell 1, in this case the control module 14 being configured to take into account at least one humidity value measured by the humidity sensor 16 in order to influence the characteristics of the second air flow F2 by controlling said system 13. The humidity sensor may be placed on one of the cathodes or at the level of the second face 7. The humidity sensor may be optional in the sense that, if the device is used in a restricted range of operating temperatures/humidities, a single temperature sensor may be enough and in this case the second flow F2 is kept constant or slaved to the output of the fuel cell 1.

In the present description, by ambient temperature is meant a temperature between 20° C. and 25° C., and by ambient humidity is meant a humidity between 30% and 50% relative humidity (RH).

According to one example, the operating step E1 mentioned above may be configured such that:

When the fuel cell is working in an environment at an ambient temperature and humidity (these temperature and humidity values being communicated as parameters to the control module 14), the first air flow F1 generated, notably upon instruction of the control module 14, is such as to enable the evacuation of the heat produced by the fuel cell while maintaining it at a nominal temperature (the temperature for which it is known to have the best output), and the second air flow F2 generated, notably upon instruction of the control module 14, is such as to enable oxygen from the air to be brought to the cathodes and water produced by the fuel cell to be evacuated in the form of vapour (for this, the humidity value of the fuel cell can be used by the control module to adapt the corresponding setpoint).

If the temperature value of the environment in which the device is placed (notably communicated to the control module 14) exceeds the ambient temperature or if the measured temperature of the fuel cell (notably communicated to the control module 14) exceeds its nominal temperature established when the fuel cell is operating at ambient temperature, the flow rate of the first air flow generated, notably upon instruction of the control module 14, during step E1-1 is increased to maintain the core of the fuel cell at its nominal temperature. Moreover, in this case the flow rate of the second air flow generated, notably upon instruction of the control module 14, during step E1-2 may be decreased to maintain the optimal hydration of the membrane. In fact, the air sweeping through the cathodes being hotter, it will have a greater tendency to dry out the fuel cell core.

If the humidity value of the environment in which the device is placed (notably communicated to the control module 14) exceeds the ambient humidity or again if the measured humidity of the fuel cell (notably communicated to the control module 14) exceeds its nominal humidity established when the fuel cell is operating at ambient humidity, the flow rate of the second air flow generated, notably upon instruction of the control module 14, during step E1-2 is increased to promote the evacuation of water in the form of vapour that is generated on the side with the cathodes. Moreover, in this case, the flow rate of the first air flow generated, notably upon instruction of the control module 14, during step E1-1 is decreased (notably according to the temperature measurement) to compensate for the fact that more heat is also dissipated by ventilating the side with the cathodes more strongly (second air flow).

If the value of the load demanded from the fuel cell (notably communicated to the control module 14) situated downstream from the fuel cell (that is, the element being electrically supplied by the fuel cell) needs more power in order to operate at unchanged ambient temperature and humidity of the environment in which the device is placed, the current delivered by the fuel cell increases, in this case the temperature of the fuel cell will increase and the quantity of water produced by the fuel cell will also increase: the measured values of temperature and humidity of the fuel cell will thus increase consequently. In this case, it is necessary to increase, notably upon instruction of the control module 14, the ventilation at the level of the first face 6, that is, increase the flow rate of the first air flow F1, and increase, notably upon instruction of the control module 14, the ventilation at the level of the second face 7, that is, increase the flow rate of the second air flow F2. Here, it might be useful to employ a sensor of the load demanded from the fuel cell to anticipate and apply the protocol without having to wait to measure the increases in temperature and humidity.

From what has been said above, it follows more generally that the operating step E1 may comprise a step E1-3 of determining at least one temperature value of the fuel cell 1, a step E1-4 of determining at least one humidity value of the fuel cell, a step E1-6 of adjustment of the first air flow F1 generated during the step E1-1 of generating the first air flow F1 taking into account said at least one temperature value determined, a step E1-7 of adjustment of the second air flow F2 generated during the step E1-2 of generating the second air flow F2 taking into account said at least one humidity value determined. According to an embodiment where the environment is controlled in terms of humidity, steps E1-4 and E1-7 are optional, the second air flow being able to remain constant or slaved to the output of the fuel cell. Advantageously, the adjustment of the first air flow and the adjustment of the second air flow are done in synergy, for example, the adjustment of the first air flow may take into account the second air flow adjusted for example to optimize the temperature of the cell core by taking into account the impact of the adjustment of the second air flow on the temperature of the fuel cell. Alternatively or in combination, the method may also comprise a step of determination of the load (for example, a current value) demanded from the fuel cell such that the first and second air flows F1, F2 are adjusted as a function of the load so determined—for example, during the detection of an increase in the load—for example by increasing their flow rates in event of detection of an increase in the load.

Moreover, during its operation the device (and thus the fuel cell) may be subjected to environmental variations, that is, the environment in which the device is placed may change. In this case, the following parameters, mentioned above, may be monitored and utilized: the temperature value of the environment in which the device is placed, the humidity value of the environment in which the device is placed, the atmospheric pressure value to which the device is subjected. This is especially so because the planar fuel cell is light and has little thermal inertia. By a change in the environment is meant notably variations in temperature of the environment, of the humidity of the environment, of the aerolics (wind) of the environment—in this case, a flow sensor (not represented) may be used to determine the heat exchange of the fuel cell with the outside—and/or the pressure of the environment. It will then be understood that the indicator of the heat exchange flow with the outside may be used by the control module 14 to determine the effects of the environment as regards the temperature of the fuel cell in order to be taken into account when working out the setpoint for control of the system 13 to control the first and second air flows. These changes in the environment may impact the measurements taken at the level of the temperature sensor and the humidity sensor mentioned above, which will automatically result in an adapted enslavement of the system 13 by the control module 14. Alternatively, the device may comprise additional sensors adapted to measure these changes in characteristics of the environment and connected to the control module 14 so that the latter may take them into account in the context of the enslavement. In other words, during the aforementioned operating step E1, the fuel cell is considered to be in a stable mode which may be impacted by the environmental variations which the control module 14 may take into account when it is aware of the adequate parameters for limiting these impacts and maximizing the output of the fuel cell. For example, in event of a drop in temperature of the environment, the control module 14 might decrease the flow rate of the first air flow F1 to limit the cooling of the fuel cell 1; in event of a rise in the temperature of the environment, the control module 14 might increase the flow rate of the first air flow F1 to increase the cooling of the fuel cell 1; in event of an increase in humidity of the environment, the control module 14 might increase the flow rate of the second air flow F2 to prevent wetting the cathodes; in event of a decrease in humidity of the environment, the control module 14 might decrease the flow rate of the second air flow F2 to prevent drying out the membrane 5. The atmospheric pressure value of the environment might be utilized to determine the altitude in order to ascertain the oxygen content of the air in order to adapt the second air flow F2 to ensure a sufficient oxygen concentration at the level of the cathodes. In this regard, the control module 14 also ensures a maintaining of the fuel cell in a nominal operating mode despite these outside perturbations.

According to one embodiment, the enslavement of the system 13 by the control module 14 to control the first air flow and the second air flow may be implemented by feedback control loops of type PI, PD, PID (where P means Proportional, I means Integral, and D means Derivative), all or nothing type, or any other type of regulation.

In order to assure a good adaptability of the first and second air flows F1, F2, the system 13 may comprise a first ventilation element 13a able to generate the first air flow F1 and a second ventilation element 13b able to generate the second air flow F2. Notably, the first ventilation element 13a is reserved exclusively for the generation of the first air flow F1 and the second ventilation element is reserved exclusively for the generation of the second air flow F2, so there is a total separation independent of the management of the first and second air flows F1, F2. These two ventilation elements 13a, 13b may thus be controlled in independent manner by the control module 14, for example to adapt the rates of the first air flow F1 and the second air flow F2 to the demand. Each of the first and second ventilation elements 13a, 13b may be composed of one or more axial or radial fans, one or more turbines, one or more compressors. The first and/or second ventilation elements 13a, 13b may be used in air extraction or blowing, in continuous duty, in pulse width modulation or in pulsed mode.

Since the first air flow F1 notably designed to cool the fuel cell may reach more sizeable maximum flow rates than those of the second air flow F2, the first ventilation element 13a may have a greater power than that of the second ventilation element 13b. By greater power of one ventilation element as compared to another is meant its ability to generate an air flow with a larger flow rate.

The control module 14 may be configured to control the powering of the first and/or second ventilation elements 13a, 13b, in particular as a function of the parameters mentioned above. Notably, the first and/or second ventilation elements 13a, 13b are configured to be powered by pulse width modulation (technology known as PWM), which enables a continuous powering of the first and/or second ventilation element 13*a*, 13*b* or an intermittent powering of the first and/or second ventilation element 13*a*, 13*b*. Such a powering is advantageous in the sense that it allows a fine tuning of the first and second air flows F1, F2.

An operating step E1 has been described above. This step is preferably implemented when the fuel cell 1 has reached a stable mode, notably in terms of the temperature of its core, and when one seeks to maintain this stability over time. The device may also have undergone a start-up under suboptimal conditions, that is, the environment in which the device is placed does not allow an optimal functioning of the fuel cell during its start-up, and in this case the control module 14 may control the system 13 during start-up in order to reach this stable mode as soon as possible.

In this regard, according to one embodiment, the method may comprise a start-up step E2 (FIG. 2) for the fuel cell 1 in which the system 13 is controlled (for example, to generate the first air flow according to a first flow rate and/or the second air flow according to a second flow rate) by taking into account at least one of the following parameters, determined at the level of a start-up phase of the fuel cell: the temperature value of the environment in which the device is started/utilized, the humidity value of the environment in which the device is started/utilized, the indicator of a duration of a storage period of the device. By at the level of the start-up phase of the fuel cell 1 is meant, for example, just prior to starting its operation or just after starting its operation. The temperature of the environment in which the device is started can be determined by measuring the temperature from the temperature sensor 15 of the fuel cell 1 prior to starting the operation of the fuel cell, since in this case it is considered that the fuel cell has a temperature identical to that of the environment in which it is placed, alternatively the device may comprise an additional temperature sensor placed at a distance from the fuel cell 1. The humidity of the environment in which the device is placed may be determined from the humidity sensor 16 of the fuel cell 1 if one believes that prior to start-up the humidity which it is measuring is comparable to that of the environment, alternatively the device may comprise an additional humidity sensor placed at a distance from the fuel cell. In this case, it is possible to distinguish different scenarios which may be implemented by the system 13 after acquisition of the adapted parameters. In a first scenario, if the temperature and humidity values of the environment in which the device is started, determined for example by measurement, are considered to be the ambient temperature and humidity as previously defined, in order for the fuel cell to reach its nominal performance as soon as possible it is preferable for the temperature of the core of the fuel cell to be nominal as soon as possible: in this case, at start-up, the ventilation, notably implemented by the control module 14, at the level of the first face 6 should be zero (the first air flow F1 is not generated) or minimal, that is, with the smallest flow rate that the first ventilation element (such as a fan) is able to provide, and then it will increase up to an adapted flow rate of the first air flow F1 when the core of the fuel cell 1 reaches its nominal temperature; the second air flow F2 will simply have a sufficient flow rate to feed oxygen to the fuel cell 1. In a second scenario, if the humidity value of the environment, determined for example by measurement, is considered to be representative of a dry environment (for example, below 30% RH or Relative Humidity), and that the temperature value of the environment, determined for example by measurement, is considered to be elevated (notably the temperature of the environment is considered to be elevated when it becomes greater than 25° C.), or after a prolonged period of storage of the fuel cell, for example longer than one month (in this case, the indicator of the duration of storage of the device may be compared to a threshold by the control module to determine whether the storage was prolonged or not), the ventilation, notably implemented by the control module 14, of the second face 7 (that is, the second air flow F2) should be adapted to maintain a maximum of water in the cell core, and so it is minimal, that is, with the lowest flow rate which the second ventilation element (such as a fan) is able to provide, this ventilation of the second face 7 may then increase to an adapted value when the cell core has reached its nominal temperature. In parallel with this second scenario, the ventilation, notably implemented by the control module 14, of the first face 6 (that is, the flow rate of the first air flow F1) should be maximal (the first ventilation element may then function so that the flow rate of the first air flow is maximized) at start-up and then change to its nominal value when the cell core reaches its nominal temperature. In a third scenario, for a start-up at lower temperature (typically when the temperature of the outside environment is below +20° C.) or at negative temperature (below 0° C.), it is necessary to increase the temperature of the cell core very quickly. In this latter case, the fuel cell may even start in degraded output to optimize the raising of the temperature of the cell core (the voltage—or output—of the fuel cell is lowered) and the ventilations of the first and second faces should be minimal, that is, the lowest flow rate which the first and second ventilation elements (notably the fans) are able to provide or zero in the case of the ventilation of the first face. We note that, in this case, heating resistors (in the form of a film, wires, a serpentine or other form) placed on the first and/or second faces 6, 7, and/or in the distribution chamber 8 and/or in the plate 9 and/or in the gas diffusion layer 12 may be utilized and will participate in the raising of the temperature of the fuel cell. By degraded output is meant for example that the fuel cell is associated with a nominal voltage that corresponds to the nominal output of the fuel cell, and that by voluntarily lowering this voltage the fuel cell is considered to be in a "degraded output" mode. The indicator of the output of the fuel cell (notably when it corresponds to a degraded output), when it is communicated to the control module 14, allows the latter to generate one or more corresponding setpoints, for example to minimize the first and/or second air flows in the third scenario. In this third scenario, the ventilation of the second face 7 of the fuel cell 1 may also be regulated in pulsed mode, that is, by alternating periods of flow and periods with no flow in order to allow the core of the fuel cell to increase its temperature as soon as possible. Finally, still in this third scenario, when the core of the fuel cell reaches its nominal temperature, the conditions of ventilation (first and second air flow) and output of the fuel cell are returned to nominal values.

According to a particular embodiment, resulting from what has been said above, the method may comprise the start-up step E2 of the fuel cell such that said fuel cell initially has a degraded output less than the nominal output (for example, by providing a degraded voltage less than the voltage of nominal operation, the output will be considered to be degraded), and said start-up step comprises a step of increasing the output of the fuel cell up to a nominal output of the fuel cell (for example, by increasing the degraded voltage up to the voltage of nominal operation), notably the increasing is done in progressive or stepwise manner. In particular, in the course of the step of increasing the output, the flow rate of the first air flow F1 increases notably in such a way that when the core of the fuel cell reaches its nominal operating temperature, the flow rate of the first air flow F1 corresponds to the flow rate adapted at this nominal operating temperature in order to maintain the core of the cell at this nominal operating temperature. FIG. 3 precisely illustrates a start-up in which the fuel cell starts at a degraded output corresponding to a voltage of 10 V, given that the nominal voltage of the fuel cell is of the order of 13 V. This voltage is progressively increased until the reaching of the nominal mode of the order of 13 Volts. In FIG. 3, the points represent the power generated by the fuel cell as a function of time, and the sawtooth lines represent the output voltage of the fuel cell which is effectively measured. Here, the stabilization of the fuel cell during its start-up in a cold environment results from three parameters, the ventilation on the side with the anodes, the ventilation on the side with the cathodes, and the output (or voltage of the fuel cell). This makes it possible for the fuel cell to be available to ensure its function of generating electricity as soon as possible.

We have described above various implementations of a start-up step, and after this start-up step the method can switch to the operating step E1.

For certain applications, it may be of interest to never allow a drop of liquid water into the core of the fuel cell after operating in order to prevent this liquid water, in event of storage at negative temperature, from freezing and causing the delamination (destruction) of the core of the fuel cell. In this regard, a protocol for shutdown of the fuel cell may be used. In this case, the second air flow F2 should be at a maximum (the second ventilation element may then operate such that the flow rate of the second air flow is maximized) to evaporate the water located in the core of the fuel cell, and the first air flow F1 should be zero or minimal (that is, with the lowest flow rate which the fan—or first ventilation element 13a—is able to provide) to maintain the cell core at temperature for the longest possible time (the evaporation of the water is promoted by elevated temperatures). This ventilation may be continued after the stoppage of the fuel cell, that is, after the operating step E1. In other words, the method may comprise a step of shutdown E3 (FIG. 2) of the fuel cell during which the second air flow F2 is generated, for example, by maximizing it, to dry out the core of the fuel cell. By maximization of the second air flow F2 is meant that its flow rate is such that it allows an optimal evaporation of the water located in the core of the fuel cell. During this step of shutdown E3, the first air flow F1 should be either zero or minimized. During this step of shutdown E3, the aforementioned heating resistors may or may not be activated.

The various enslavement examples provided above are only general cases indicating the main tendencies which may be adapted depending on the intrinsic characteristics of the fuel cell and its packaging.

According to one particular embodiment illustrated in FIGS. 4 and 5, the device may comprise two fuel cells depending on the purpose of utilization of the electricity generated. For this, said fuel cell 1 forms a first fuel cell and the device comprises an additional planar fuel cell 1a forming a second fuel cell of the same type as FIG. 1. It will be understood that the second fuel cell 1a may then comprise cells 2a each provided with an anode 3a and a cathode 4a associated with a membrane 5a of the second fuel cell, preferably said membrane 5a of the second fuel cell 1a being common to all the cells 2a of said second fuel cell 1a. Furthermore, said second fuel cell 1a may comprise a first face 6a and a second face 7a opposite to the first face 6a, said first face 6a being arranged on the side with the anodes 3a of said second fuel cell 1a and said second face 7a being arranged on the side with the cathodes 4a of said second fuel cell 1a. The first and second cells are preferably of the same type, that is, of identical architectures and parameters, thus the first and second cells 1, 1a comprise notably the same number of cells. This particular embodiment makes it possible to increase the power density per volume and preferably each fuel cell sees the same quantity of first air flow and second air flow. It is possible to distinguish two cases in this particular embodiment.

In a first case (FIG. 5), the first and second fuel cells 1, 1a are arranged such that the first face 6 of the first fuel cell 1 is facing the first face 6a of the second fuel cell 1a so as to bound off at least in part a circulation channel 17 of the first air flow F1 between the first and second fuel cells 1, 1a. In the first case, the second air flow F2 will be generated by the system 13 and oriented so as to circulate along the first face 7 of the first fuel cell 1. Furthermore, the first and second fuel cells being similar/identical, a third air flow F3 will be generated by the system 13 so as to have the same characteristics as the second air flow F2 and this third air flow F3 will be directed towards the second face 7a of the second fuel cell 1a. For this, it would be possible to use a third fan 13c arranged with respect to the second face 7a of the second fuel cell 1a in a manner similar to the arrangement of the second fan 13b with respect to the second face 7 of the first fuel cell 1, and in this case the second and third fans will be controlled in the same way by the control module 14: this makes it possible to have a homogeneity of behaviour of two identical fuel cells 1, 1a placed in the same environment. This first case (FIG. 5) has the advantage of using the same first air flow F1 in common with two adjacent fuel cells, notably generated by the same first fan 13a. In a second case (FIG. 4), the second face 7a of the second fuel cell 1a is facing the second face 7 of the first fuel cell 1 so as to bound off at least in part a circulation channel 18 of the second air flow F2 between the first and second fuel cells. In this second case, the first air flow F1 will be generated by the system 13 and oriented so as to circulate along the first face 6 of the first fuel cell 1. Furthermore, the first and second fuel cells 1, 1a being of identical type, a third air flow F3 will be generated by the system 13 such as to have the same characteristics as the first air flow F1 and this third air flow F3 will be directed towards the first face 6a of the second fuel cell 1a. For this, one could use a third fan 13c arranged with respect to the first face 6a of the second fuel cell 1a in a manner similar to the arrangement of the first fan 13a with respect to the first face 6 of the first fuel cell 1, and in this case the first and third fans 13a, 13c will be controlled in the same way by the control module 14, whereas the second fan 13b designed to generate the second air flow F2 may be controlled in independent manner by the control module 14: this makes it possible to have a homogeneity of behaviour of two identical fuel cells placed in the same environment. This second case has the advantage of using the same second air flow F2 in common with two adjacent planar fuel cells. Furthermore, the functioning of the fuel cells being identical, the temperature sensor of the fuel cell and the humidity sensor of the fuel cell are only needed on one of the fuel cells. Of course, the device may also comprise more than two fuel cells placed one on top of the other, and in this case the fuel cells are such that, for any pair of fuel cells placed one on top of the other, their facing faces bound off a circulation channel for a corresponding air flow. In the present paragraph, the first, second and third fans may be generalized as first, second and third ventilation elements.

According to one particular embodiment illustrated in FIG. 6, the invention also relates to a flying object 100 comprising at least one device 101 as described. The flying object 100 may be a drone or any type of object adapted to move by flying in the air. In this case, the system 13 configured to generate the first air flow F1 and the second air flow F2 is such that at least one of the first and second air flows F1, F2 is generated during the flight of the flying object, notably by the movement of the object in the air or by a system of propulsion of the flying object. In this case, the device may be such that the movement of the object 100 in the air or its system of propulsion causes the formation of an air flow which is guided within the object 100, notably by channels 102, 103, to reach as applicable the first face 6 and/or the second face 7 of the fuel cell 1. In this regard, the method may be such that the steps of generating the first air flow and/or the second air flow result from a displacement of the device in the air, notably when the latter is carried by the flying object as described. Furthermore, in this case the first ventilation element and/or the second ventilation element might comprise flaps or diaphragms enabling more or less, or not at all, the passage of air in the direction of the first face or the second face, as applicable, of the fuel cell.

We shall now describe an experimental analysis in which the device comprises two fuel cells of ten mono-cells—or cells—each 3 cm2 placed in series in two parallel planes as described in FIG. 4, as well as operating peripherals (purge valves, expander, sensors, fans) whose total weight is 300 g and the total volume is 350 cc. Here, the two fuel cells each comprise a fuel distribution chamber 8, the cell core (N collectors, N electrodes, 1 electrolyte, with N≤N≤10, here with N=10), the gas diffusion layer and a metallic grill to homogenize the thermal flows. These two fuel cells were tested at −10° C., +5° C.; +25° C. and +44° C. with two fans placed at each anode side and two central fans at the cathode side—it will be understood here that each anode side is associated with two fans and that the channel between two fuel cells is associated with two fans. A temperature sensor was placed on the fuel cell at the level of the first face of one of the two fuel cells to allow a measuring of the temperature of the fuel cells and to ensure the enslavement of the fans generating the first, second and third air flows on the basis of this measured temperature. In the analysis, the voltage imposed on the fuel cell was 13 volts and the regulating setpoint of the fuel cell was 45° C. so that the fans were controlled so as to ensure the maintaining of this temperature of 45° C. at the level of the core of the fuel cell. It was observed that, in the course of time, the available power generated by the fuel cell remained overall between 13 W and 15 W and this in the temperature range of —10° C. to 45° C. According to the test protocol, it was just noted that at 45° C. the cell core had a temperature of the order of 54° C. which produced a less optimal power, but of the order of 13.5 W, that is, still usable to provide the electrical energization of an element in particular.

Generally speaking, it will be understood from the present description that the device described as well as the associated method make it possible to ensure a phase of start-up, of operation, and of shutdown of one or more planar fuel cells, and this in a broad range of environmental conditions which may run from −40° C. to +70° C. and preferably from −20° C. to +45° C., via the utilization of a double ventilation on the side with the anodes and on the side with the cathodes of the fuel cell, and if necessary a modulation of the output (or voltage) of the fuel cell.

The modulation of the output of the fuel cell may be implemented either during the start-up step E2 of the fuel cell, or the operating step E1 of the fuel cell, or during the shutdown step E3 of the fuel cell. For example, in nominal mode (that is, during step E1), it is possible to compensate for the lack of evacuation of the heat by the first airflow F1 (notably if the fans are too small in dimension) by a lesser generation of heat, that is, in nominal operation at 45° C., one may increase the operating output of the fuel cell to generate less heat and ease the burden on the anode ventilation. As another example, at very low temperature of the outside environment (temperature below −20° C.), even if the ventilation of the first airflow F1 is zero, and the ventilation of the second airflow F2 is minimal, it may happen that the device in nominal mode exchanges too much heat with the outside, causing a drop in temperature of the fuel cell core. In this case, a degraded output (or decrease in voltage) may be used to encourage the generation of heat and allow the fuel cell core to raise its temperature again (this degraded output might be coupled to the use of heating resistors, as described above). Moreover, the fuel cell generally feeds a load (a motor or the like), and this load may be variable over time, so that the fuel cell needs to constantly adapt its output to the power demanded by the load. If the load demanded is less than the nominal load, then the fuel cell should deliver less power; in this case, the fuel cell itself will increase its output. On the other hand, if a load peak is demanded (that is, the demanded load is greater than the nominal load), the fuel cell itself will decrease its output. One will thus understand that the control module 14 may be informed as to the indicator of the output of the fuel cell in order to adapt/adjust the first and/or second air flows. Alternatively or in combination, the control module 14 may even adjust the output of the fuel cell in synergy with the controlling of the first and second ventilation elements—or more generally with the controlling of the first and second air flows in independent manner—to maintain the core of the fuel cell at a determined temperature. In other words, the control module 14 may be configured to modify the output of the fuel cell. Furthermore, the method may comprise a step of modulation of the output of the fuel cell, this step possibly taking into account the temperature of the fuel cell or any other physical characteristic—that is, this step takes into account, or is dependent on, a value representative of the temperature of the core of the fuel cell—and optionally the characteristics of the first air flow and/or the second air flow, notably with a view to stabilizing the temperature of the core of the fuel cell.

It will be understood from what has been said above that the method may comprise a step of modulation of the output of the fuel cell 1 dependent on a representative value determined (notably by measurement) for the temperature of the core of the fuel cell 1. One will understand that, depending on the representative value determined for the temperature of the core of the fuel cell 1, the modulation of the output of the fuel cell will be adapted as applicable. In particular, this step of modulation (E2-1, E1-8, E3-1) of the output may be implemented during the start-up step E2 and/or during the operating step E1 and/or during the step E3. In fact, one will here try to maintain the core of the cell in a range, or at a temperature, that corresponds to an optimal operating temperature or temperatures. This representative value for the determined temperature of the core of the cell may be realized by calculation, for example, based on measurement(s) obtained from the temperature sensor or resistors connected to the fuel cell. This step of modulation of the output of the fuel cell may also take into account the characteristics of the first and second air flows. In particular, the step of modulation of the output of the fuel cell may be such that the output is voluntarily lowered (for example, by decreasing the voltage of the fuel cell) to cause a heating of the fuel cell and thus of its core, or such that the output is voluntarily increased in order to lower the temperature of the core of the fuel cell.

It will thus be understood that, as regards the device, this may also comprise an element 19 (FIG. 1) configured to adapt the output of the fuel cell 1, said element 19 being able to receive at its input a value representative of the temperature of the core of the fuel cell 1, in order to produce an output setpoint to be applied to the fuel cell 1.

In summary, the double ventilation (first and second air flow) is slaved to at least one or more sensors for measuring temperature, pressure and humidity, of flow. We note that these various sensors may be combined with (or replaced by) measurements of internal resistances, or polarization resistance, or total resistance of the fuel cells or mono-cells/cells in order to estimate the values which would have been measured by the sensors so replaced. In particular, the measurements of resistances (internal/polarization/total) are done directly on the cells (also known as mono-cells), so there is no need for additional sensors to be added. The measurements coming from the various sensors possibly being, as applicable, characteristic of the state of hydration or desiccation of the mono-cells, it is possible to slave the ventilations on the side with the anodes and the side with the cathodes as a function of one or more of these parameters.

The device and the method have the advantage of being able to use a single fluid, air, to cool the fuel cell. Moreover, this fluid is directed by first and second air flows which can be generated by two independent ventilations, notably implemented by the first and second ventilation elements described above. In this regard, the two faces of the fuel cell known as the first and second faces may form direct heat exchangers of the fuel cell in the sense that they will be in direct contact with the first and second air flow, respectively.

The invention claimed is:

1. A device intended to generate electricity, said device comprising:
    a planar fuel cell comprising:
        cells each provided with an anode and a cathode associated with a membrane,
        a first face and a second face opposite to said first face, said first face being arranged on the side with the anodes of said fuel cell and said second face being arranged on the side with the cathodes of said fuel cell, and
    a system configured to generate a first air flow intended to cooperate thermally with the first face, and configured to generate a second air flow intended to cooperate with the second face to ensure the supply of oxidizer to the cathodes of said fuel cell.

2. The device according to claim 1, wherein said membrane is common to all the cells of said fuel cell.

3. The device according to claim 1, wherein the first face of said fuel cell is bounded off at least in part by an outer wall of a fuel distribution chamber, and in that wherein the second face of said fuel cell is bounded off at least in part by a perforated plate, notably metallic.

4. The device according to claim 1, further comprising a control module configured to act on said system in order to control the first and second air flow in independent manner.

5. The device according to claim 4, wherein the control module is configured to receive at its input at least one of the following parameters in order to determine at least one control setpoint for the system: a temperature value of the fuel cell, a humidity value of the fuel cell, a physical parameter of electrical resistance measured at the level of the fuel cell, a temperature value of the environment in which the device is placed, a humidity value of the environment in which the device is placed, a value of the load demanded from the fuel cell, an atmospheric pressure value of the environment in which the device is placed, an indicator of a duration of storage of the device, an indicator of the output of the fuel cell, an indicator of the heat flow exchanged with the outside.

6. The device according to claim 1, wherein said fuel cell forms a first fuel cell and tat wherein the device comprises an additional planar fuel cell forming a second fuel cell comprising:
    cells each provided with an anode and a cathode associated with a membrane of the second fuel cell, preferably said membrane being common to all the cells of said second fuel cell,
    a first face and a second face opposite to said first face, said first face being arranged on the side with the anodes of said second fuel cell and said second face being arranged on the side with the cathodes of said second fuel cell,
    the first and second fuel cells being arranged such that:
    the first face of the first fuel cell is facing the first face of the second fuel cell so as to bound off at least partly a channel for circulation of the first air flow between the first and second fuel cells, or
    the second face of the second fuel cell is facing the second face of the first fuel cell so as to bound off at least partly a channel for circulation of the second air flow between the first and second fuel cells.

7. The device according to claim 1, wherein the system comprises a first ventilation element able to generate the first air flow and a second ventilation element able to generate the second air flow.

8. The device according to claim 4, further comprising a temperature sensor arranged so as to measure a temperature value of the fuel cell, the control module being configured to take into account at least one temperature value measured by the temperature sensor to influence the characteristics of the first air flow when controlling said system.

9. The device according to claim 4, further comprising a humidity sensor arranged so as to measure a humidity value of the fuel cell, said control module being configured to take into account at least one humidity value measured by the humidity sensor to influence the characteristics of the second air flow when controlling said system.

10. The device according to claim 1, further comprising an element configured to adapt the output of the fuel cell, said element receiving at its input a value representative of the temperature of the core of the fuel cell in order to produce an output setpoint to be applied to the fuel cell.

11. A flying object comprising at least one device according to claim 1, wherein the system configured to generate the first air flow and the second air flow is such that at least one of the first and second air flows is generated during the flight of said flying object.

12. A method of utilization of a device according to claim 1, said method comprising an operating step comprising a step of generating the first air flow by the system such that said first air flow generated cooperates with the first face of the fuel cell and a step of generating the second air flow by the system such that said second air flow generated cooperates with the second face of the fuel cell.

13. The method according to claim 12, wherein the operating step comprises:
- a step of determining at least one temperature value of the fuel cell,
- a step of determining at least one humidity value of the fuel cell,
- a step of adjustment of the first air flow generated during the step of generating the first air flow taking into account said at least one temperature value determined,
- a step of adjustment of the second air flow generated during the step of generating the second air flow taking into account said at least one humidity value determined.

14. The method according to claim 12, further comprising a step of start-up of the fuel cell such that said fuel cell initially has a degraded output less than a nominal output of the fuel cell, said start-up step involving a step of increasing the output of the fuel cell up to the nominal output, notably in a progressive or stepwise manner.

15. The method according to claim 14, wherein the flow rate of the first air flow increases during the step of increasing the output.

16. The method according to claim 12, further comprising a step of start-up of the fuel cell wherein the system is controlled by taking into account at least one of the following parameters determined at the level of a start-up phase of the fuel cell:
- a temperature value of the environment in which wherein the device is used,
- a humidity value of the environment in which wherein the device is used,
- an indicator of a duration of a storage period of the device.

17. The method according to claim 12, further comprising a step of shut-down of the fuel cell during which the second air flow is generated to dry out the core of the fuel cell.

18. The method according to claim 12, further comprising a step of modulation of the output of the fuel cell dependent on a representative value determined for the temperature of the core of the fuel cell.

* * * * *